United States Patent

Gopalakrishna

[11] Patent Number: 6,059,923
[45] Date of Patent: May 9, 2000

[54] ROTARY ACOUSTIC HORN WITH SLEEVE

[75] Inventor: Haregoppa S. Gopalakrishna, Woodbury, Minn.

[73] Assignee: 3M Innovative Properties Company, St. Paul, Minn.

[21] Appl. No.: 09/157,033

[22] Filed: Sep. 18, 1998

[51] Int. Cl.[7] .................................................. B29C 65/08
[52] U.S. Cl. .................. 156/580.2; 156/73.1; 425/174.2
[58] Field of Search .................. 156/73.1, 555, 156/580, 580.1, 580.2, 582; 425/174.2; 228/110.1, 1.1

[56] References Cited

U.S. PATENT DOCUMENTS

| | | | |
|---|---|---|---|
| 4,534,818 | 8/1985 | Kreager et al. | 156/466 |
| 4,668,316 | 5/1987 | Sager | 156/73.1 |
| 4,681,645 | 7/1987 | Fukushima et al. | 156/73.1 |
| 5,057,182 | 10/1991 | Wuchinich | 156/580.1 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,562,790 | 10/1996 | Ehlert et al. | 156/73.1 |
| 5,645,681 | 7/1997 | Gopalakrishna et al. | 156/580.2 |
| 5,707,483 | 1/1998 | Nayar et al. | 156/580.2 |
| 5,922,170 | 7/1999 | Gerdes et al. | 156/580.2 |
| 5,945,642 | 8/1999 | Nayar et al. | 181/184 |

FOREIGN PATENT DOCUMENTS 2082090  3/1970  France .
2282559  4/1995  United Kingdom .

OTHER PUBLICATIONS

Dukane Ultrasonics (Brochure), 1995.
Herrmann Ultrasonics (Brochure), Ultrasonic Bonding and Cutting of Nonwovens, Textiles, Film and Paper Non–Contact/Non–Wear.
Data Sheet PW–45, Branson Ultrasonics Corporation, 1992.
"Sonic Kit—High Speed Sonic Welding Kit," Cera, France (Brochure).
"Rotosonic 250T Ultrasonic Seaming Machine", Cera, France (Brochure).
"Ultrasonic Cylinder Arm Machines," Sonobond Ultrasonics (Brochure).
"Ultrasonic Lace Maker and Sewing Machine," LaceMaster 20 Series, Sonobond Ultrasonics (Brochure).

*Primary Examiner*—James Sells
*Attorney, Agent, or Firm*—Charles D. Levine

[57] ABSTRACT

A rotary acoustic horn imparts energy at a selected wavelength, frequency, and amplitude. The horn includes a shaft having an axial input end and an axial output end and a welding portion. The welding portion is mounted on the shaft and has a diameter that is greater than the diameter of the shaft. The welding portion has a weld face that expands and contracts with the application of acoustic energy. At least a portion of the weld face can be formed of a different material than the remainder of the welding portion. The welding portion can include a sleeve. The sleeve can be shrink fit onto the welding portion.

10 Claims, 1 Drawing Sheet

well under way.

ROTARY ACOUSTIC HORN WITH SLEEVE

TECHNICAL FIELD

The present invention relates to acoustic welding horns. More particularly, the present invention relates to rotary acoustic welding horns.

BACKGROUND OF THE INVENTION

In acoustic welding, such as ultrasonic welding, two parts to be joined (typically thermoplastic parts) are placed directly below an ultrasonic horn. In plunge welding, the horn plunges (travels toward the parts) and transmits vibrations into the adjacent part. The vibrations travel through this part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In this mode, typically the ultrasonic horn is stationary and the part is moved beneath it. Scan welding is a type of continuous welding in which the part is scanned beneath one or more stationary horns. In transverse welding, both the table over which the parts pass and the part being welded remain stationary with respect to each other while moving underneath the horn or while the horn moves over them.

Many uses of ultrasonic energy for bonding and cutting thermoplastic materials involve ultrasonic horns or tools. A horn is an acoustical tool usually having a length of a multiple of one-half of the horn material wavelength and made of, for example, aluminum, titanium, or steel that transfers the mechanical vibratory energy to the part. (Typically, these materials have wavelengths of approximately 25 cm (10 in).) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations.

Traditionally, ultrasonic cutting and welding use horns which vibrate axially against a rigid anvil, with the material to be welded or cut being placed between the horn and anvil. Alternatively, in continuous high speed welding or cutting, the horn is stationary while the anvil is rotated, and the part passes between the horn and the anvil. In these cases, the linear velocity of the part is matched with the tangential velocity of the working surface of the rotating anvil.

There are, however, some limitations to this system. Because the part to be welded is continuously passed between the narrow gap formed by the anvil and the horn, compression variations are created due to part thickness nonuniformities. Drag exists between the part and the horn and may cause residual stresses in the welded region. These factors affect the weld quality and strength which, in turn, limit the line speeds. Also, the gap between the rotating anvil and the horn limits the compressible bulk or thickness of the parts to be bonded.

One way to minimize these limitations is to shape the working surface of the horn to attain a progressive convergent or divergent gap depending upon the part. This does not completely solve the problem of moving the material to be bonded past a stationary horn, as an intimate contact is needed for efficient acoustic energy transfer.

The best way to attain high quality and high speed ultrasonic welds is to use a rotary horn with a rotating anvil. Typically, a rotary horn is cylindrical and rotates around an axis. The input vibration is in the axial direction and the output vibration is in the radial direction. The horn and anvil are two cylinders close to each other, rotating in opposite directions with equal tangential velocities. The parts to be bonded pass between these cylindrical surfaces at a linear velocity equal to the tangential velocity of these cylindrical surfaces. Matching the tangential velocities of the horn and the anvil with the linear velocity of the material minimizes the drag between the horn and the material. The excitation in the axial direction is similar to that in conventional plunge welding.

U.S. Pat. No. 5,096,532 describes two classes of rotary horn. The patent compares a commercially available rotary horn, manufactured by Mecasonic-KLN, Inc. of Fullerton, Calif. (Mecasonic horn) and a rotary horn described in the '532 patent. The shape of the '532 horn differs from that of the Mecasonic horn; the '532 horn is solid, and the Mecasonic horn is a partially hollowed cylinder.

The Mecasonic horn is a full wavelength horn. The axial vibration excites the cylindrical bending mode to provide the radial motion, and the mode of vibration depends on Poisson's ratio. The radial motion of the weld face is in phase with the excitation, and there are two nodes for the axial motion, and two nodes for radial motion. The '532 horn is a half wavelength horn. The axial vibration provides the radial motion. The mode of vibration is independent of Poisson's ratio. The radial motion of the weld face is out of phase with the excitation, and there is only one node, at the geometric center of the weld face. U.S. Pat. No. 5,707,483 and U.S. Pat. No. 5,645,681 describe novel rotary acoustic horns.

In some cases, a carbide tip is brazed to the welding surface of a titanium or aluminum bar (non-rotating) horn to improve the wear characteristics. Also, a thin coating of hard material is placed on the weld surface to improve wear. The node is a position on the horn where the axial vibration is a minimum or zero. In an "Elmore" type booster, the nodal mount (on which clamping occurs) is attached to the booster by either a set screw or a shrink fit.

However, there is no suggestion anywhere of making rotary horns of multiple materials. Known rotary horns all have the same material on the welding surface as on the remainder of the welding portion. These horns are made out of aluminum (7075-T6), titanium (6al-4v) or steel (D2 tool steel, stainless steel, 15-5 PH, or other steels). Each of these materials has advantages and disadvantages. Generally the hardness of aluminum and titanium is low when compared to the hardness of the anvil. Therefore the weld surface of the horn is relatively easily damaged (such as by gouging) when used against a hard anvil. Damage is more pronounced if the horn directly contacts the anvil such as in a cut and seal operation or when the horn rides on the anvil without material in between.

To improve durability, rotary horns can be made with harder material such as D2 tool steel or crucible powder metal tool steel. Because the horn material is harder than the anvil, the horn welding surface is not scratched or gouged. However operating steel horns requires significantly more power than an aluminum or a titanium horn. More power draw heats the horn at higher amplitudes.

SUMMARY OF THE INVENTION

A rotary acoustic horn imparts energy at a selected wavelength, frequency, and amplitude. The horn includes a shaft having an axial input end and an axial output end. A welding portion is mounted on the shaft. The welding portion has a weld face that expands and contracts with the application of acoustic energy to the input end of the shaft. The horn is formed of at least two materials.

At least a portion of the weld face can be formed of a different material than the remainder of the welding portion. The welding portion can include a sleeve. The sleeve can be shrink fit onto the welding portion. The length of the sleeve can be less than, equal to, or greater than the length of the weld face.

The horn can also be formed of a single material, yet the welding portion can be formed of a core portion and a sleeve portion, such that characteristics of the horn can be changed by changing the sleeve portion.

DETAILED DESCRIPTION

The rotary horn of this invention can be a full wavelength acoustic rotary horn, a half wavelength horn, or a horn of a multiple of half wavelengths. The horn can be an ultrasonic horn. The horn imparts energy at a selected wavelength, frequency, and amplitude. The horn can ultrasonically weld parts over a relatively long width with a desired (often constant) amplitude at the radial weld face. The rotary horn can maintain a controlled amplitude across the weld face width by placing an undercut between the inner cylinder and the radial weld face.

Figure 1:
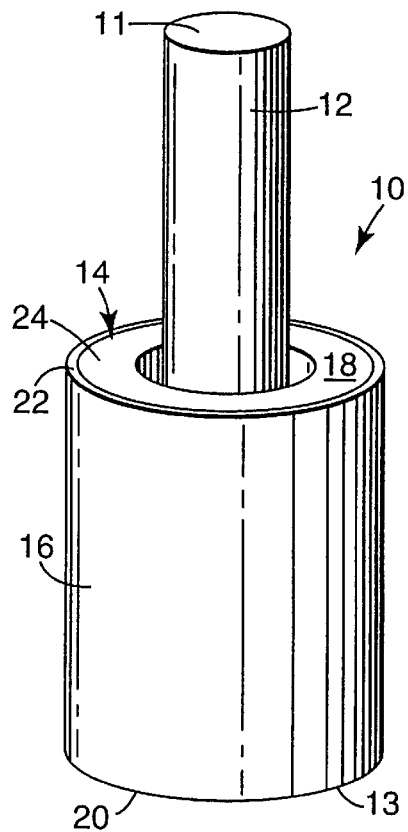
FIG. 1 is a perspective view of a horn of the present invention with a single weld surface.

The rotary horn 10, shown in FIG. 1, includes a cylindrical shaft 12 having an axial input end 11 and an axial output end 13. A cylindrical welding portion 14 is mounted on and coaxial with the shaft 12. The shaft 12 can have a hollow portion 15. This hollow portion 15 can extend for more than half of the axial length of the shaft 12 and can be longer than the welding portion 14. Also, the shaft can extend for more than half of the axial length of the welding portion.

The diameter of the welding portion 14 can be greater than that of the shaft 12. As shown, the welding portion 14 has a radially outer cylindrical weld face 16 having a diameter that expands and contracts with the application of ultrasonic energy. First and second opposing end portions 18, 20 are formed on the ends of the welding portion 14.

The center of the weld face 16 should be placed at the point of maximum deflection in the radial direction of the shaft 12. This is a nodal point for the axial motion of the horn 10. If the center of the weld face 16 is shifted above the maximum deflection point, the amplitude at the bottom is higher than the top. If the weld face 16 is placed below the maximum deflection point, the amplitude at the top is higher.

The gain can be changed at the weld face 16 by changing the mass at the input section of the horn. The horns can be extended by any multiple of one-half wavelength. The extension can be a separate component mounted on the output end of the horn or it can be formed integrally as one piece with the rest of the horn. This still yields the same amplitude at the weld face at the horn frequency.

Figure 2:
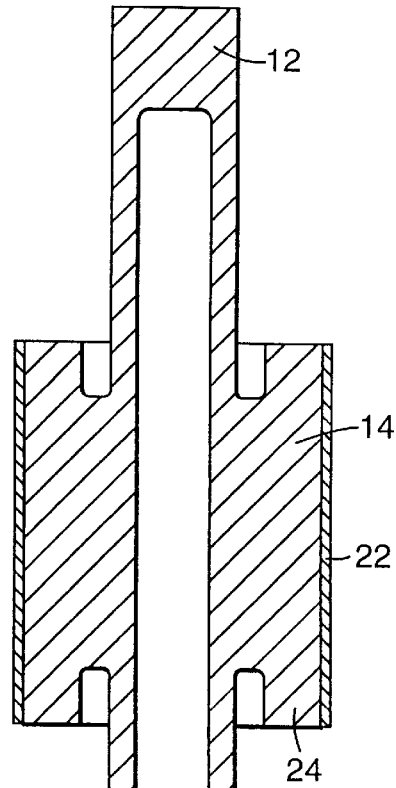
FIG. 2 is a cross-sectional view of a horn of another embodiment of the present invention with multiple weld surfaces.

As shown in FIG. 2, multiple welding portions can be used. The attachment of successive welding portions to the shaft 12 can be at a distance (center-to-center distance between adjacent welding portions) of one-half wavelength of the horn material. If desired, intermediate welding portions can be skipped so that the welding portions are positioned at full wavelengths of the horn material. This may be particularly necessary for wide weld face widths.

The inner shaft and the outer welding portion are shown as concentric cylinders of constant diameter. However, the cylinders could have varying radii or be non-concentric, and the welding portion need not be cylindrical to work with various welding configurations. For example, the welding portion could be a non-cylindrical conic section. It could be elliptical in the radial direction or can be spherical.

The rotary horn of this invention is made out of combination of two or more materials to achieve specific advantages, such as low power usage, an increased weld surface hardness, longer horn durability, and increased flexibility in the horn design, when compared to horns made out of one material. (Low power usage reduces heating of the horn which would cause a drop in the operating frequency. Heat generation changes the process conditions and introduces variability in the process.)

Figure 3:
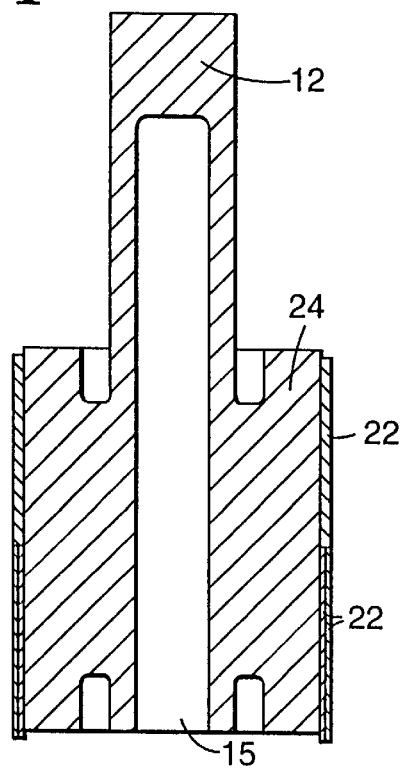
FIG. 3 is a cross-sectional view of a horn of another embodiment of the present invention.

The rotary horn of the illustrated embodiments has a separate sleeve 22 placed on the welding portion 14 to form the weld surface 16. The sleeve 22 can be the same length as the welding portion 14, or it can be longer or shorter. On the same welding portion, more than one sleeve 22 can be shrink fit and they can have different diameters and be formed of different materials. FIG. 3 shows an embodiment combining these features.

The rotary horn 10 combines the advantages of several materials. For example, the main portion of the horn, called the core 24, can be made out of either titanium or aluminum (which have a lower power draw) while the weld surface sleeve 22 can be made out of hardened steel to improve durability. Table 1 compares the text book material properties of aluminum, titanium, and steel. Table 2 compares the design and behavior of rotary horns made of the materials compared in Table 1. Because the materials have approximately the same ratio of modulus to density, the shape and geometry of the horn made of each material is similar.

TABLE 1

Material Properties

| Material | Aluminum | Titanium | Steel (Hardened) |
|---|---|---|---|
| Modulus of Elasticity, E, (MPa) | $6.88 \times 10^4$ | $11.0 \times 10^4$ | $20.6 \times 10^4$ |
| Density, p, (k/m$^2$) | 2796 | 4429 | 8028 |
| Fatigue strength, $\sigma_e$, (MPa) | 165–234 | 517–634 | 621–758 |
| Hardness, Rockwell C | Less than 20 | 36–40 | 56–60 |
| Ductility (% strain in 5.08 cm sample) | 12 | 8–10 | 4–5 |
| Thermal Conductivity Watt/m-° K. | 121 | 7 | 35–43 |

TABLE 2

Design and behavior of the horn

| Material | Aluminum | Titanium | Steel (Hardened) |
|---|---|---|---|
| Shape and Geometry f(E/ρ) | Similar to others | Similar to others | Similar to others |
| Amplitude, A | 1.0 | 1.0 | 1.0 |
| Stress, σ = f(E × A) | 1.0 | 1.6 | 3.0 |
| Factor of safety (Approximately) = (σ$_e$/σ) | 1.2 | 2.0 | 1.3 |
| Power =       A = 1.0 | 1.0 | 1.6 | 3.0 |
| f(E × A$^2$)     A = 2.0 | 2.0 | 4.0 | 6.4 | 12.0 |

Titanium is best at high amplitudes because of its higher factor of safety. The power drawn and heat generated in the horn is proportional to the strain energy, which is a function of the modulus and the square of strain (square of amplitude). Thus, the power drawn in titanium and steel horns is 1.6 and 3.0 times more than that of aluminum horns, respectively. If the amplitude is doubled, the power draw is significantly higher in steel compared to aluminum and titanium. Because the thermal conductivity is higher in aluminum, the localized heat generation at the high strain region is better conducted to other parts, allowing the horn to cool quickly and uniformly.

Tool steel is far harder than aluminum and titanium. Hence there is less surface damage when a steel horn is used against an anvil. Aluminum and titanium are more ductile. This means that the presence of micro cracks are less detrimental than compared to a hardened steel horn.

Aluminum is cheaper and easier to machine than the other materials. Steel is cheaper and easier to machine before hardening than titanium. Titanium is expensive and costs significantly more to machine.

The rotary horn 10 combines the advantages of these multiple materials. With the core 24 made of aluminum and the sleeve 22 made of hardened D2 tool steel, for example, the horn draws low power like an aluminum horn, has a hard weld surface like a steel horn, is easy to machine, and is relatively inexpensive. With the core made of titanium and the sleeve made of hardened D2 tool steel, the horn has good strength and a hard weld surface.

There are other advantages of using a separate sleeve as the weld surface. The weld patterns can be incorporated into the sleeve. If a new pattern is desired, only the sleeve need be changed; the entire horn need not be destroyed. Another advantage is that if the horn frequency is higher than desired, a new sleeve with a higher thickness can be fitted, tuning the horn without making an entirely new horn. When the sleeve is shrunk fit over the core, the sleeve is subjected to hoop tensile stress while the core is subjected to compressive stress. Since aluminum fatigue strength is low (stress reversal is due to vibration) a pre-compression by shrink fit can increase the life of the horn. If the sleeve is intended to apply pre-compression, the sleeve can be shrink fit at other locations. For example, a sleeve can be placed inside the hollow portion 15 so that the sleeve is under compression.

If internal cutouts or slots are to be made in the welding portion, for example to achieve uniform amplitude, the current invention permits the cutouts to be made in the core with the sleeve shrunk fit over the cutouts and the core to close the slots. This simplifies manufacturing these types of horns.

The sleeve 22 can be placed on the core 24 by any method including shrink fitting, internal screws, and adhesive. In shrink fitting, the outer diameter of the core 24 is greater than the inner diameter of the sleeve 22. This interference must be carefully designed. If the interference is low, then the shear stress generated during the vibration causes slippage resulting in heat generation at the core-sleeve interface. If the interference is too high, the hoop tensile stress in the sleeve due to shrink fit superimposed with the vibrational stress can cause the sleeve to fail. A structural adhesive at the interface of core and sleeve can be used along with shrink fitting. The compressive stress from the shrink fit helps to hold the adhesive. Also, a knurling on the interface surfaces can help contain the adhesive. If adhesive is not used, a diameter interference of about 2 mil per inch of horn diameter is desired. In shrink fitting, the core of the horn can be cooled in dry ice and the sleeve is heated in an oven. Because of the shrinkage in the outer diameter of the core, there is no need for excessive heating of the sleeve.

Various changes and modifications can be made in the invention without departing from the scope or spirit of the invention. Although the horn has been described as being formed of aluminum, titanium, and steel, other materials, metals and nonmetals, can be used. Also, the horn can be made with more than two materials. A sleeve of harder material can also be placed on other portions of the horn where reduced wear is desired, such as the nodal region to reduce wear because of bearing mounting.

I claim:

1. A rotary acoustic horn for imparting energy at a selected wavelength, frequency, and amplitude, wherein the horn comprises:

a shaft having an axial input end and an axial output end; and at least one welding portion mounted on the shaft, wherein the welding portion comprises a weld face that expands and contracts with the application of acoustic energy to the input end of the shaft, and wherein the horn is formed of at least first and second materials.

2. The rotary acoustic horn of claim 1 wherein at least a portion of the weld face is formed of the second material and the remainder of the welding portion is formed of the first material.

3. The rotary acoustic horn of claim 2 wherein the portion of the weld face that is formed of the second material comprises at least one sleeve.

4. The rotary acoustic horn of claim 3 wherein the sleeve is shrink fit onto the welding portion.

5. The rotary acoustic horn of claim 3 wherein the first material includes at least one of aluminum and titanium and the second material includes steel.

6. The rotary acoustic horn of claim 3 wherein the length of the sleeve is one of less than, equal to, or greater than the length of the weld face.

7. A rotary acoustic horn for imparting energy at a selected wavelength, frequency, and amplitude, wherein the horn comprises a shaft having an axial input end and an axial output end; and a welding portion mounted on the shaft, wherein the welding portion comprises a weld face that expands and contracts with the application of acoustic energy to the input end of the shaft; wherein the welding portion is formed of a core portion and a sleeve portion, such that characteristics of the horn can be changed by changing the sleeve portion.

8. The rotary acoustic horn of claim 7 wherein the sleeve is shrink fit onto the welding portion.

9. The rotary acoustic horn of claim 7 wherein the core portion is formed of a first material and the sleeve portion is formed of a second material.

10. The rotary acoustic horn of claim 9 wherein the first material includes at least one of aluminum and titanium and the second material includes steel.

* * * * *